3,351,431
FORMULA AND METHOD FOR DETERMINING THE PROPORTION OF FAT IN DAIRY PRODUCTS

John H. Berry, 2512 W. 79th St.,
Inglewood, Calif. 90305
No Drawing. Filed Jan. 21, 1965, Ser. No. 427,123
12 Claims. (Cl. 23—231)

The invention herein described pertains to a method for determining the proportion of fat in dairy products, and more particularly to a method for determining the percentage of fat in test samples of milk, cream, ice cream mix, cheese, evaporated milk, butter or other natural or artificial dairy products.

The most common method for making these quantitative analyses has been the Roese-Gottlieb method. In applying this process to a test sample of ten grams of milk, 1.5 milliliters of ammonium hydroxide is first mixed with milk. After that a total of 95 milliliters of chemicals is added in six separate transfers with mixing and shaking after each transfer. These chemicals comprise, in all, 15 milliliters of 95% (by volume) alcohol, 40 milliliters of ethyl ether and 40 milliliters of petroleum ether. It is not important to our present purpose to detail the sequence in which different amounts of the chemicals are added, and the proportions in which they are used in each cast, but the complexity of the process is pretty well shown by the following brief summary of the steps involved in extracting the fat and determining the amount thereof in a given sample.

These steps are as follows: (1) the initial addition to the sample that is to be tested of three different ingredients; (2) a vigorous shaking for thirty seconds; (3) the addition of another ingredient; (4) another thirty-second period of shaking; (5) the lapse of enough time for the solution to separate sufficiently for the portion in the upper part of the container to become relatively clear; (6) the careful drawing off of the heavier or unclear portion of the solution from the bottom of the container; (7) the extraction of the clear liquid remaining in the container; (8) the addition of two more ingredients to the clear liquid; (9) another thirty-second period of shaking; (10) the addition of another ingredient; (11) another thirty-second period of shaking; (12) the addition of another ingredient; (13) another thirty-second period of shaking; (14) allowing the solution to stand again until the top portion is practically clear; (15) drawing off the clear fat solution into a flask or other storage vessel; (If the complete removal of all fat is required, still one more extraction is advisable. The fat solvent that is drained off in the second or third extractions must of course be added to the portion saved from the first extraction.) (16) the total amount of fat solvent removed during the preceding steps must now be evaporated; and (17) the residue of fat remaining after the evaporation must be dried at about 100° centigrade and then weighed.

One object of the present invention is to greatly simplify the test that has just been detailed.

Another object is to reduce the number of ingredients that must be added to the sample and to lessen the overall time period required for the test.

A further object is to provide a process in which the chemicals that must be added to the sample are less expensive than have heretofore been required.

An additional object is to simplify the separation of the fat solvent from the substract.

Another object is to provide an efficient solvent that is ready mixed and that requires only one transfer to the sample under test, only one period of shaking and only one extraction of the fat-containing solvent.

A further object is to provide a process in which the solvent that must be evaporated is far less than must be evaporated when other methods are used.

Yet another object is the provision of a solvent that contains none of the highly flammable ethyl ether whose fumes are explosive and injurious to health in the Roese-Gottlieb process.

Still another object is to provide a process for the purposes described that will require very simple apparatus.

This invention possesses many more advantages and has other objects which may be made more clearly apparent from a consideration of the process itself. This process will now be described; but it is to be understood that this detailed description is not to be taken in a limiting sense, since the scope of the invention is best defined by the appended claims.

In the fat solvent used in the novel process now to be described, acetone and petroleum ether together constitute between seventy-five and eighty percent by volume of the total, the relative proportions of these two varying between forty-five and fifty-five percent of their combined volume, the balance of the solvent consisting of butanol (n-butyl alcohol). It will thus be seen that in forty milliliters of the solvent, the acetone and petroleum ether constitute a total of between thirty and thirty-two milliliters and the butanol may constitute the remainder of between eight and ten milliliters.

The size of the sample that must be transferred to the mixing bottle depends on the approximate fat content of the product being tested; for example: about 10 grams of milk, approximately one gram of cream, about 3 grams of evaporated milk or of an ice cream mix, about 2 grams for cheese and roughly ½ gram for butter. When preparing the sample of cheese from which the fat is to be extracted, the cheese must first be grated. A sample whose size has been predetermined according to its approximate fat content, as outlined in this paragraph, will sometimes be referred to hereinafter as *a calculated test sample*, in order to avoid needless repetition in describing the process.

Excepting in the case of milk and cheese, a certain amount of water should be added to each calculated test sample to bring the total contents of the mixing vessel to approximately 10 milliliters before chemicals are added. The calculated test sample of cheese must first be grated, and the amount of water to be added is approximately nine milliliters. The calculated test samples of cream and butter require the addition of seven milliliters of water, while the test samples of ice cream mix or cream require only that seven milliliters of water be added. Any calculated test sample to which water has been added as just prescribed, will be hereinafter referred to as an *adjusted test sample*.

A 2-ounce polyethylene bottle with a screw top makes a satisfactory mixing container. After placing a sample of milk, or an adjusted test sample of a milk product, in the bottle, the first step in the process is to add one ml. of a 1.5% aqueous solution of sodium bicarbonate and then 40 ml. of the fat test solvent provided by the instant invention and described in the third paragraph just preceding. The cap must then be screwed tightly onto the bottle, which should next be shaken vigorously until the contents of the vessel have become thoroughly mixed. This will be approximately one minute, excepting for cheese, which requires a minimum of twenty minutes. The shaking may of course be done by a mechanical shaker.

After the shaking or thorough mixing has been completed, the contents of the mixing bottle should be poured into an open-end separatory funnel of about 60 ml. capacity, care being taken to see that the stopcock is closed.

A four-minute period is then required for complete separation of the solvent fat solution from the residue in the funnel.

The next step is to open the stopcock in the bottom of the separatory funnel and to draw off the substrate to about one-quarter of an inch of the clear solvent, leaving this one-fourth of an inch of substrate in the funnel as an assurance against the inadvertent withdrawal of some of the solvent.

The next step in the process is to add one drop of a special coloring solution to the contents of the separatory funnel. This coloring fluid is an aqueous solution of alcohol in which the alcohol comprises 10% (by volume) of the total. The solution must be highly colored with methylene blue powder. The one drop of this coloring solution that is added to the contents of the funnel will pass through the solvent in the funnel and lodge on top of the small amount of the substrate that has not yet been removed. The methyl blue clearly shows the line of separation between the fat solvent and the substrate.

The cock at the bottom of the separatory funnel should now be opened and the substrate carefully drawn off to the blue line of separation. This will leave only solvent fat solution in the separatory funnel.

The next step in the process is the removal of the fat from the solvent. This is preferably done in an aluminum cup into which the remaining contents of the separatory funnel must be transferred.

The solvent is of course separated from the dissolved fat by evaporating the solvent. The fat that remains in the cup after the evaporation has been completed, must then be dried at a temperature of approximately 100° centigrade. The dried fat should then be weighed and its weight compared with that of the sample that was placed under test.

The process that has just been described is extremely efficient and accurate. From products such as cheese and evaporated milk, which require a most efficient solvent to remove the last traces of fat, the amount of fat removed is slightly higher than can be obtained by other processes. With dairy products other than cheese and evaporated milk, the amount of fat removed by this process is practically identical to that removed by the much slower and more costly Roese-Gottlieb method.

Some of the benefits of the novel process hereinbefore described may be obtained by omitting the use of the solution of alcohol containing the blue coloring material and removing all of the substrate as accurately as possible after the four minute period allowed for its separation. The results of the process will of course not be as precise as when the solution of alcohol with the coloring material is used to facilitate the accurate separation of the fat-containing solvent from the substrate, but the process will nevertheless be substantially as accurate as previously used processes and will of course effect a saving of time and cost.

The inventor claims:

1. A solvent for the extraction of fat in milk or milk products in which acetone and petroleum ether together constitute between seventy-five and eighty percent by volume of the total, the proportions of these two varying inversely between forty-five and fifty-five percent of their combined volume, the balance of the solvent consisting of n-butyl alcohol.

2. The process of determining the proportion of fat in milk or milk products which comprises: placing 10 grams of milk or an adjusted sample of a milk product in a mixing vessel, adding approximately one milliliter of a 1.5% aqueous solution of sodium bicarbonate or a chemical equivalent to the milk, adding 40 milliliters of the solvent described in claim 1 to the contents of the vessel, tightly sealing the vessel, shaking the vessel vigorously until its contents have become thoroughly mixed, transferring the contents of the vessel to an open-end separatory funnel while the stopcock of the funnel is closed, leaving the contents of the funnel undisturbed therein for approximately four minutes, drawing off the substrate from the bottom of the funnel to within approximately a quarter of an inch of the clear solvent above the substrate, placing in the funnel one drop of an aqueous solution containing approximately 10% alcohol colored with methylene blue powder, carefully withdrawing the substrate remaining in the funnel to the blue line of separation, transferring the contents of the funnel above the blue line to an evaporation container, separating the solvent and the fat in the container by evaporating the solvent, drying the remaining fat at approximately 100° centigrade, weighing the dried fat and determining the percent that the weight of the fat bears to the weight of the milk or of the calculated test sample of the dairy product originally placed in the mixing vessel.

3. The process of determining the proportion of fat in milk which comprises: placing 10 grams of the milk in a mixing vessel, adding approximately one milliliter of a 1.5% aqueous solution of sodium bicarbonate or a chemical equivalent to the milk, adding 40 milliliters of the solvent described in claim 1 to the contents of the vessel, tightly sealing the vessel, shaking the vessel and its contents vigorously for approximately one minute, transferring the contents of the vessel to an open-end separatory funnel while the stopcock of the funnel is closed, leaving the contents of the funnel undisturbed therein for approximately four minutes, drawing off the substrate from the bottom of the funnel to within approximately a quarter of an inch of the clear solvent above the substrate, placing in the funnel one drop of an aqueous solution containing approximately 10% alcohol colored with methylene blue powder, carefully withdrawing the substrate remaining in the funnel to the blue line of separation, transferring the contents of the funnel above the blue line to an evaporation container, separating the solvent and the fat in the container by evaporating the solvent, drying the remaining fat at approximately 100° centigrade, weighing the dried fat and determining the percent that the weight of the fat bears to the weight of the milk originally placed in the mixing vessel.

4. The process of determining the percent of fat in a sample of cheese which comprises: grating approximately two grams of the cheese, placing the grated cheese in a mixing vessel, adding approximately nine milliliters of water and one milliliter of a 1.5% aqueous solution of sodium bicarbonate or a chemical equivalent to the grated cheese, adding 40 milliliters of the solvent described in claim 1 to the contents of the vessel, tightly sealing the vessel, shaking the vessel and its contents vigorously for a minimum of twenty minutes, transferring the contents of the vessel to an open-end separatory funnel while the stopcock of the funnel is closed, leaving the contents of the funnel undisturbed therein for approximately four minutes, drawing off the substrate from the bottom of the funnel to within approximately a quarter of an inch of the clear solvent above the substrate, placing in the funnel one drop of an aqueous solution containing approximately 10% alcohol colored with methylene blue powder, carefully withdrawing the substrate remaining in the funnel to the blue line of separation, transferring the contents of the funnel above the blue line to an evaporation container, separating the solvent and the fat in the container by evaporating the solvent, drying the remaining fat at approximately 100° centigrade, weighing the dried fat and determining the percent that the weight of the fat bears to the weight of the grated cheese originally placed in the mixing vessel.

5. The process of determining the percent of fat in cream which comprises: placing one gram of the cream in a mixing vessel, adding approximately nine milliliters of water and one milliliter of a 1.5% aqueous solution of sodium bicarbonate or a chemical equivalent to the contents of the mixing vessel, adding 40 milliliters of the solvent described in claim 1 to the contents of the vessel, tightly sealing the vessel, shaking the vessel and its contents vigorously for approximately one minute, transferring the contents of the vessel to an open-end separatory funnel while the stopcock of the funnel is closed, leaving the contents of the funnel undisturbed therein for approximately four minutes, drawing off the substract from the bottom of the funnel to within approximately a quarter of an inch of the clear solvent above the substract, placing in the funnel one drop of an aqueous solution containing approximately 10% alcohol colored with methylene blue powder, carefully withdrawing the substract remaining in the funnel to the blue line of separation, transferring the contents of the funnel above the blue line to an evaporation container, separating the solvent and the fat in the container by evaporating the solvent, drying the remaining fat at approximately 100° centigrade, weighing the dried fat and determining the percent that the weight of the fat bears to the weight of the cream originally placed in the mixing vessel.

6. The process of determining the percent of fat in a sample of evaporated milk or an ice cream mix which comprises: placing three grams of the evaporated milk or ice cream mix in a mixing vessel, adding 7 milliliters of water and approximately one milliliter of a 1.5% aqueous solution of sodium bicarbonate or a chemical equivalent to the contents of the vessel, adding 40 milliliters of the solvent described in claim 1 to the contents of the vessel, tightly sealing the vessel, shaking the vessel and its contents vigorously for approximately one minute, transferring the contents of the vessel to an openend separatory funnel while the stopcock of the funnel is closed, leaving the contents of the funnel undisturbed therein for approximately four minutes, drawing off the substract from the bottom of the funnel to within approximately a quarter of an inch of the clear solvent above the substract, placing in the funnel one drop of an aqueous solution containing approximately 10% alcohol colored with methylene blue powder, carefully withdrawing the substract remaining in the funnel to the blue line of separation, transferring the contents of the funnel above the blue line to an evaporation container, separating the solvent and the fat in the container by evaporating the solvent, drying the remaining fat at approximately 100° centigrade, weighing the dried fat and determining the percent that the weight of the fat bears to the weight of the sample originally placed in the mixing vessel.

7. The process of determining the percent of fat in a sample of butter which comprises: placing one-half gram of the butter in a mixing vessel, adding approximately nine milliliters of water and approximately one milliliter of a 1.5% aqueous solution of sodium bicarbonate or a chemical equivalent to the contents of the mixing vessel, adding 40 milliliters of the solvent described in claim 1 to the contents of the vessel, tightly sealing the vessel, shaking the vessel and its contents vigorously for approximately one minute, transferring the contents of the vessel to an open-end separatory funnel while the stopcock of the funnel is closed, leaving the contents of the funnel undisturbed therein for approximately four minutes, drawing off the substract from the bottom of the funnel to within approximately a quarter of an inch of the clear solvent above the substract, placing in the funnel one drop of an aqueous solution containing approximately 10% alcohol colored with methylene blue powder, carefully withdrawing the substract remaining in the funnel to the blue line of separation, transferring the contents of the funnel above the blue line to an evaporation container, separating the solvent and the fat in the container by evaporating the solvent, drying the remaining fat at approximately 100° centigrade, weighing the dried fat and determining the percent that the weight of the fat bears to the weight of the butter originally placed in the mixing vessel.

8. The process of determining the proportion of fat in milk or milk products which comprises: placing 10 grams of milk or an adjusted sample of a milk product in a mixing vessel, adding approximately one milliliter of a 1.5% aqueous solution of sodium bicarbonate or a chemical equivalent to the milk, adding 40 milliliters of the solvent described in claim 1 to the contents of the vessel, tightly sealing the vessel, shaking the vessel and its contents vigorously until its contents have become thoroughly mixed, transferring the contents of the vessel to an open-end separatory funnel while the stopcock of the funnel is closed, leaving the contents of the funnel undisturbed therein for approximately four minutes, drawing off the substract from the bottom of the funnel, transferring the contents of the funnel to an evaporation container, separating the solvent and the fat in the container by evaporating the solvent, drying the remaining fat at approximately 100° centigrade, weighing the dried fat and determining the percent that the weight of the fat bears to the weight of the milk or milk product originally placed in the mixing vessel.

9. The process of determining the percent of fat in a sample of cheese which comprises: grating approximately two grams of the cheese, placing the grated cheese in a mixing vessel, adding approximately nine milliliters of water and one milliliter of a 1.5% aqueous solution of sodium bicarbonate or a chemical equivalent to the cheese, adding 40 milliliters of the solvent described in claim 1 to the contents of the vessel, tightly sealing the vessel, shaking the vessel and its contents vigorously for a minimum of twenty minutes, transferring the contents of the vessel to an open-end separatory funnel while the stopcock of the funnel is closed, leaving the contents of the funnel undisturbed therein for approximately four minutes, drawing off the substract from the bottom of the funnel, transferring the contents of the funnel to an evaporation container, separating the solvent and the fat in the container by evaporating the solvent, drying the remaining fat at approximately 100° centigrade, weighing the dried fat and determining the percent that the weight of the fat bears to the weight of the cheese originally placed in the mixing vessel.

10. The process of determining the percent of fat in cream which comprises: placing one gram of the cream in the mixing vessel, adding approximately nine grams of water and one milliliter of a 1.5% aqueous solution of sodium bicarbonate or a chemical equivalent to the contents of the mixing vessel, adding 40 milliliters of the solvent described in claim 1 to the contents of the vessel, tightly sealing the vessel, shaking the vessel and its contents vigorously for approximately one minute, transferring the contents of the vessel to an open-end separatory funnel while the stopcock of the funnel is closed, leaving the contents of the funnel undisturbed therein for approximately four minutes, drawing off the substract from the bottom of the funnel, transferring the contents of the funnel to an evaporation container, separating the solvent and the fat in the container by evaporating the solvent, drying the remaining fat at approximately 100° centigrade, weighing the dried fat and determining the percent that the weight of the fat bears to the weight of the cream originally placed in the mixing vessel.

11. The process of determining the percent of fat in a sample of evaporated milk or an ice cream mix which comprises: placing three grams of the evaporated milk or ice cream mix in a mixing vessel, adding 7 milliliters of water and approximately one milliliter of a 1.5% aqueous solution of sodium bicarbonate or a chemical equivalent to the contents of the vessel, adding 40 milliliters of the solvent described in claim 1 to the contents of the vessel, tightly sealing the vessel, shaking the vessel and its contents vigorously for approximately one minute, transferring the contents of the vessel to an open-end separatory funnel while the stopcock of the funnel is closed, leaving the contents of the funnel undisturbed therein for approximately four minutes, drawing off the substract from the bottom of the funnel, transferring the contents of the funnel to an evaporation container, separating the solvent and the fat in the container by evaporating the solvent, drying the remaining fat at approximately 100° centigrade, weighing the dried fat and determining the percent that the weight of the fat bears to the weight of the sample originally placed in the mixing vessel.

12. The process of determining the percent of fat in a sample of butter which comprises: placing one-half gram of the butter in a mixing vessel, adding approximately nine milliliters of water and approximately one milliliter of a 1.5% aqueous solution of sodium bicarbonate or a chemical equivalent to the contents of the mixing vessel, adding 40 milliliters of the solvent described in claim 1 to the contents of the vessel, tightly sealing the vessel, shaking the vessel and its contents vigorously for approximately one minute, transferring the contents of the vessel to an open-end separatory funnel while the stopcock of the funnel is closed, leaving the contents of the funnel undisturbed therein for approximately four minutes, drawing off the substract from the bottom of the funnel, transferring the contents of the funnel to an evaporation container, separating the solvent and the fat in the container by evaporating the solvent, drying the remaining fat at approximately 100° centigrade, weighing the dried fat and determining the percent that the weight of the fat bears to the weight of the butter originally placed in the mixing vessel.

References Cited

UNITED STATES PATENTS 1,391,965   9/1921   Mojonnier _____ 23—231

JOSEPH SCOVRONEK, *Primary Examiner.*

E. A. KATZ, *Assistant Examiner.*